Patented Sept. 10, 1929.

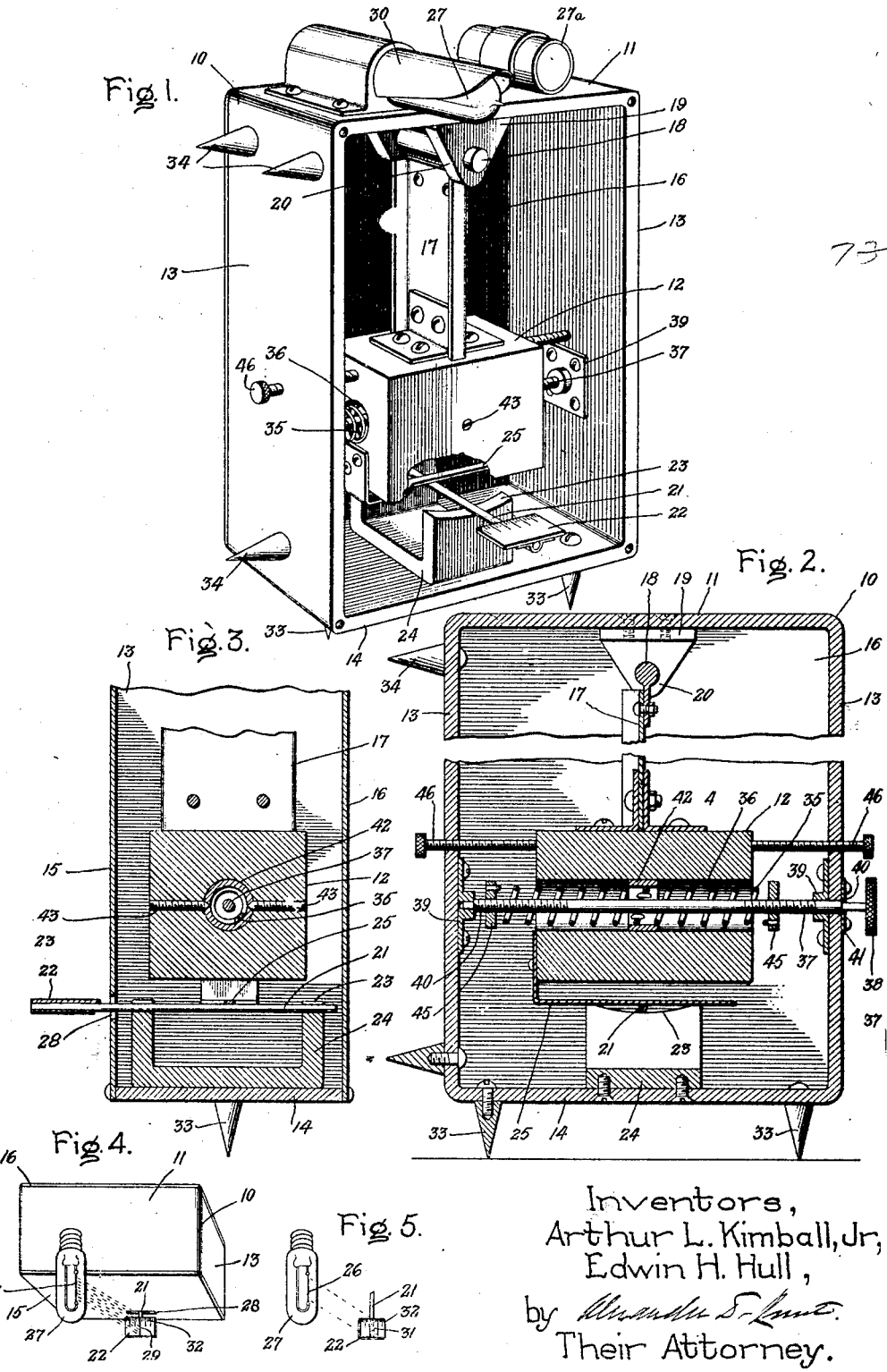

1,727,991

UNITED STATES PATENT OFFICE.

ARTHUR L. KIMBALL, JR., AND EDWIN H. HULL, OF SCHENECTADY, NEW YORK, ASSIGNORS TO GENERAL ELECTRIC COMPANY, A CORPORATION OF NEW YORK.

VIBRATION INDICATOR.

Application filed January 15, 1926. Serial No. 81,601.

The present invention relates to vibration indicators and has for its object to provide an improved instrument of this character which embodies simplicity, small size, portability and accuracy and which will permit the measurement of vibration amplitudes over a wide range of frequencies and in any direction desired.

For a consideration of what is believed to be novel attention is directed to the accompanying drawing, the description thereof and the appended claims.

In the drawing, Fig. 1 is a view in perspective of a vibration indicator embodying the invention, the front cover plate being removed to show the interior arrangement of parts; Fig. 2 is a front sectional view on an enlarged scale of the instrument shown in Fig. 1; Fig. 3 is a similar side sectional view of the lower end of said instrument; Fig. 4 is a top view of the instrument in perspective on a greatly reduced scale showing the exterior indicating means, and Fig. 5 is a similar view on the same scale of a portion of said indicating means when actuated by vibration.

Referring to the drawing, 10 indicates a rectangular frame having a wall 11 from which is suspended a pendulum weight 12. The frame is formed in the present example with side walls 13 and a bottom wall 14 providing, with the wall 11, a box-like enclosure or casing for the pendulum weight. Removable front and rear cover plates 15 and 16 respectively complete the enclosure.

The pendulum weight is suspended on an arm 17 which is pivoted on a linear pivot axis to swing in one direction, that is, in a fixed plane. In the present example, this direction may be considered to be laterally of the casing and the pivot means therefor comprises a pivot shaft 18, to which the pendulum arm 17 is secured and a U-shaped bracket 19 providing spaced bearings 20 for the shaft, arranged in front to rear relation to each other in the casing. Any other suitable pivot means providing a linear pivot axis may be used.

It will be seen from the foregoing that the pendulum weight is suspended in such a manner that the frame and said weight may move or vibrate in one direction relatively to each other, but in no other direction. This one direction is at a right angle to the pendulum arm in a plane at a right angle to the axis of pivot shaft 18.

When a device as just described is placed on a vibrating surface or object and moved into a position wherein the plane of relative movement between the frame and the weight lies in the direction of the vibratory movement or a component thereof, the frame will tend to move or vibrate in response to this movement, while the pendulum weight will tend to remain stationary. A relative movement is thus set up between the frame and the weight which corresponds in amplitude and frequency with that of the vibrating surface or object in the direction in which the frame is free to move with respect to the weight.

In order that the frame may move in full response to the vibration of objects on which it is placed, particularly objects of small mass, and in order that the pendulum weight may remain substantially stationary with respect to the frame, the latter is preferably of light weight, while the weight is comparatively heavy. That is, for a maximum indication of vibration, the frame is preferably sufficiently light, consistent with rigidity, to cause in itself no appreciable decrease of the amplitude of vibration of any object upon which it is placed, while the weight is preferably of such mass that its center of gravity remains substantially stationary in space with respect to the vibration being measured. It will be seen that with the thin-walled, box-like frame structure shown in the present example, light weight is secured while providing a rigid support for the pendulum weight and an enclosure for said weight and associated parts.

To indicate the amplitude of the relative movements of the weight and frame as a measure of vibration, a rolling mandrel 21, carrying at one end a small mirror 22, is arranged to be frictionally connected with the frame and the pendulum weight so that relative movement between said frame and weight effects a rolling, oscillatory movement of the mandrel and the mirror. The mandrel lies substantially axially parallel with and substantially in the same plane as the axis of pivot shaft 18, vertically beneath the pendulum weight when the frame is in the vertical position shown, and rests on spaced bearing surfaces 23 provided by the upturned ends of a U-shaped cradle block 24 which is secured to the bottom wall 14. Surfaces 23 are preferably, but not necessarily, slightly concave as shown so that the mandrel tends to assume a mid position thereon.

Frictionally engaging the mandrel and pressing it lightly against the bearing block is a flat spring wire 25 which is secured at one end to the pendulum weight. The spring wire passes across the mandrel substantially at a right angle thereto at a point midway between the spaced bearing surfaces 14 so that it seats the mandrel evenly on both of said surfaces.

The mirror is carried by the mandrel in a position to be illuminated by a light emitting means such as the filament 26 of a small electric lamp 27 located within range of the mirror, and at the same time to be easily observed by an operator of the device. In the present example the lamp is mounted on the frame exteriorly thereof and is supplied with energy from a small dry-cell battery 27ª also mounted on the frame. The lamp and battery are thus portable with the frame, although not necessarily so. With this arrangement the mandrel passes through a slot 28 in the front cover plate and carries the mirror at its outer end. The mirror surface is parallel with the axis of the mandrel and may be turned with the mandrel to face the lamp which projects over the front edge of wall 11. A protective visor or guard 30 is provided over the lamp. This is secured to the top wall of the frame.

The filament 26 of the lamp is preferably a single wire and arranged to lie parallel with the axis of the mandrel so that its image in the mirror will appear as a single line 29, Fig. 4, across the mirror surface when the latter is stationary. If the frame is moved by vibration relatively to the pendulum weight, the mandrel and mirror will roll or oscillate through a small angle, the size of which is determined by the diameter of the mandrel and the amplitude of the vibration. The light reflected from the mirror will move through twice this angle and thus may serve to amplify and indicate the amplitude of the vibration. With a given mandrel the width of the angle through which the reflected light moves is a measure of the amplitude of the vibration.

Under the same conditions, the image of the lamp filament will appear to move back and forth across the mirror face and if the frequency of the vibrations is anything but very low, the eye cannot follow the successive positions of the image, with a result that it will appear on the mirror face as a band 31, Fig. 5, the width of which serves as a measure of the ampltiude of the vibratory movement.

To aid in more accurately comparing various indications of vibration, a scale 32 is provided on the mirror face. The scale is graduated in any suitable units, for example, in mils, so that the amplitude of the vibration may be read directly in mils thereon. The use of a scale on the mirror obviates the necessity of an external scale as would be necessary in measuring the angular movement of the reflected light from the mirror above mentioned, and provides accurate, easily observed indications without adding bulk or weight to the instrument or detracting from its portability.

As hereinbefore explained, the instrument is directional in its response to vibration and in order to take advantage of this in investigating the direction of vibration in an object subject to vibration, the frame is adapted to stand in an upright position as shown or to lie in substantially a horizontal position. For this purpose the bottom wall and one side wall are provided with suitable supporting feet 33 and 34 respectively. In the present example the feet are conically pointed and spaced sufficiently to provide a stable three-point support for the frame in either of its positions and to permit it to rest evenly on either a curved or a flat surface.

In order to maintain the pendulum weight in its normal suspended position with respect to pivot shaft 18 and mandrel 21 when the frame is placed on feet 34 or tilted from the vertical position, an adjustable spring means is provided in connection with the weight to give it a suitable elastic support.

This may be provided by any suitable means and in the present example comprises a helical spring 35 loosely carried in a cylindrical transverse tunnel 36 in the weight and a threaded shaft 37 provided with a knurled head 38 by which the shaft is rotated. The shaft passes axially through the spring and tunnel and is journaled in suitable bearings 39 mounted on the side walls 13 of the frame. Shoulders 40 on the shaft in connection with a retaining plate 41 in the wall 13 adjacent the head end and a socket in the bearing at the opposite end serve to hold the shaft against axial movement while permitting it to be rotated. At a point substantially midway of its length, the spring is secured to the pendulum weight through the medium of a ring 42. The latter is located in the tunnel midway of its length and is pivoted therein by a pair of oppositely disposed set-screws 43 which meet it at a right angle to the axis of the tunnel. The spring is secured to the ring by any suitable means such as a spot welding for example. The free ends of the spring are each connected with a nut 45 threaded onto shaft 37. This arrangement thus provides a resilient connection between the weight and the frame which may be adjusted to resiliently support the weight. Adjustment is effected by rotating the knurled head 38 in either one direction or the other. This causes the nuts 45 to move along the shaft, both in the same direction, thus putting one-half of the spring under compression and the other half under tension and thereby biasing the weight in the direction of the compression and tension.

When the frame is placed on feet 34 to render the frame responsive to vibrations in a general vertical direction, it will be seen that by rotating the head 38 in the proper direction sufficient biasing force may be put upon the pendulum weight to counteract the effect of its weight and to support it in the same position as when normally suspended, with the frame in a vertical position.

Likewise when the frame is placed in any tilted position while investigating vibration in different directions, other than in a horizontal plane, the biasing means is utilized to restore the pendulum weight to its normal position before readings are taken. Thus all readings of vibration indications may be taken with the pendulum weight in the same relation to the rolling mandrel 21 and the pivot shaft 18.

To prevent the pendulum weight from swinging through a wide arc whereby the mandrel would be carried out of adjustment on the cradle block, while the device is in use, and to lock the pendulum weight when the device is not in use or being carried, an adjustable stop means is provided for said weight. This comprises, by way of example, two thumb screws 46 threaded through the side walls of the frame in positions to engage at their ends the opposite sides of the pendulum weight, as shown. When the device is in use the screws are withdrawn slightly so that pendulum weight and casing are permitted to move relatively sufficiently to give an indication of the full amplitude of the vibratory movement which it is desired to be indicated.

From the foregoing description it will be seen that the principle of the instrument is very simple. There are in effect two relatively movable adjacent surfaces, one represented by the pendulum weight and the other by the frame, holding between them a rolling mandrel on which is mounted means for indicating oscillatory movement of the mandrel. This is preferably a mirror. One surface is rendered stationary or substantially so by its inertia, while the other is rendered responsive to vibratory movement so that the mandrel is subjected to an oscillatory rolling movement when the latter surface is subjected to vibration. The mirror moves through a small angle, the size of which is determined by the diameter of the mandrel and the amplitude of the vibration and by its movement serves to indicate the vibration. The extent or amplitude of the vibration is determined by projecting a beam of light upon the mirror surface and observing the reflection therefrom or by observing the broadening of the image of the light emitting means on the mirror due to the oscillatory movement of the latter, a scale on the mirror surface in connection with the image serving as a convenient means for reading the amplitude of the vibration directly.

In using an instrument as herein described, the frame is set on the object subject to vibration with the lamp 27 lighted and the weight released by the thumb screws 46. The mirror is turned to face the lamp so that the image of the filament may be observed. If the object is vibrating in a direction at a right angle to the pendulum arm 17 and in a plane at a right angle to the axis of pivot shaft 18, such vibration will effect a movement of the frame of like amplitude and frequency. Because of the pivot connection and the inertia of the weight, the latter and the spring wire will remain substantially stationary with respect to the frame and the mandrel.

Vibrations of the frame will be transmitted to the mandrel and mirror through the cradle block, causing the mandrel to roll or oscillate along the spring wire, and the mirror to oscillate through a small angle. The angular degree of oscillation of the mirror will be proportional to the amplitude of vibration in the object and will be indicated by the width of vibratory movement of the filament image on the mirror surface adjacent the scale thereon as hereinbefore described.

The instrument will respond to vibrations of the object upon which it is placed only in a direction at a right angle to the pendulum arm and in a plane at a right angle to the pivot axis of the pendulum weight. This directional property of the instrument is then utilized in investigating vibration in the object at different angles in both the vertical position and the horizontal position or other directions between the vertical and horizontal by setting the instrument at different angles on the object. If the instrument is set on feet 34, the pendulum weight is adjusted to its normal position by the spring adjustment means as hereinbefore described.

The instrument, while simple in structure, is very sensitive and in its present embodiment covers a range of amplitudes from about .0002 of an inch up to any value desired, depending only upon the size of the mirror mandrel used, the higher amplitudes requiring larger mandrels. Since the spring wire is flexible and the mandrel only frictionally held between it and the cradle block, the substitution of one mandrel and mirror for another is very simple. It has been found that the frequency range of the present embodiment of the invention is from a few hundred a minute up to more than twelve thousand a minute.

One use to which the instrument is well adapted is in investigating the presence and nature of vibrations in machinery, such as motors, and elastic-fluid turbines for example. The instrument may be placed at different points on the machine and at different angles and by its use the amplitude and direction of the vibrations may be observed.

What we claim as new and desire to secure by Letters Patent of the United States, is:

1. In a vibration indicator, a frame, a pendulum suspended therefrom, rigid means carried by said frame and yielding means carried by said pendulum which means cooperate to provide two relatively movable adjacent surfaces in adjustable relation to each other, and a rolling mandrel held between said surfaces.

2. In a vibration indicator, two relatively movable members each carrying means, one of said means being rigid and the other yieldable, which means cooperate to provide two relatively movable adjacent surfaces, a rolling mandrel held between said surfaces, and means connected with the mandrel for indicating oscillatory movement thereof.

3. In a vibration indicator, a frame, a pendulum suspended therefrom, pivot means for the pendulum for confining it to movement in a fixed plane, a rolling mandrel, means carried by the frame providing a rigid support for the mandrel, means carried by the pendulum for engaging the mandrel and resiliently holding the same on the rigid support, and means connected with the mandrel for indicating oscillatory movement thereof.

4. In a vibration indicator, a suspended pendulum and a cradle block over which the pendulum is adapted to swing, means carried by the pendulum co-operating with the cradle block to provide relatively movable adjacent surfaces, a rolling mandrel held between said surfaces, means carried by the mandrel providing a mirror surface, there being a graduated scale on the mirror surface, and light-emitting means arranged to project a beam of light upon the mirror surface adjacent the scale.

5. In a vibration indicator, a casing and a pendulum suspended within the casing providing two relatively movable members, a rolling mandrel, means carried by the mandrel providing a light-reflecting mirror surface, and means carried by said movable members and frictionally engaging the mandrel for transmitting thereto an oscillatory movement, said last-named means comprising a spring member carried by the pendulum and a rigid supporting member for the mandrel carried by the casing.

6. In a vibration indicator, a casing and a pendulum suspended within the casing providing two relatively movable members, pivot means for the pendulum for confining it to movement in a single plane, a rolling mandrel, means carried by each of said members, each of which means frictionally engages the mandrel, means providing an adjustable resilient connection between said members, said casing having two sides which lie substantially at a right angle to each other and at a right angle to the plane of movement of the pendulum; and means providing three spaced points of support for at least one of said sides.

7. In a vibration indicator having two relatively movable members, means providing a pivot axis about which one of said members moves in a fixed plane, a rolling mandrel, means carried by each of said members which means cooperate to frictionally engage the mandrel, means carried by the mandrel providing a light-reflecting mirror surface, and means providing an adjustable resilient connection between said members.

8. In a vibration indicator, the combination with a pendulum, of a supporting frame therefor, a rolling mandrel, means carried by the pendulum and means carried by the frame which means connect said pendulum and frame with the mandrel for transmitting to the latter relative movement of said pendulum and frame, and means connected with the pendulum and frame providing an adjustable resilient connection between them.

9. In a vibration indicator, the combination with a pendulum weight, of a supporting frame therefor, a rolling mandrel, means carried by the frame providing a bearing for the mandrel, a spring wire carried by the pendulum weight frictionally engaging the mandrel, and means providing a light-reflecting mirror surface carried by the mandrel.

10. In a vibration indicator, the combination with a pendulum weight, of a supporting frame therefor, means providing a pivot axis about which said weight and frame are relatively movable in a fixed plane, a rolling mandrel, means carried by the frame providing a bearing for the mandrel, a spring wire carried by the pendulum weight frictionally engaging the mandrel, means carried by the mandrel providing a light-reflecting mirror surface, and light-emitting means arranged to project a beam of light upon the mirror surface.

11. In a vibration indicator, the combination with a pendulum weight, of a supporting frame therefor, means providing a pivot axis between the frame and the weight about which said frame and weight are relatively movable in a fixed plane, a rolling mandrel having its axis substantially at a right angle to said plane, means carried by the frame providing a bearing for the mandrel, a spring wire carried by the pendulum weight frictionally engaging the mandrel at a substantially right angle to its axis, means carried by the mandrel providing a mirror surface, and light-emitting means arranged to project a beam of light upon the mirror surface.

12. In a vibration indicator, the combination with a pendulum weight, of a supporting frame therefor, means providing a pivot axis between the frame and the weight on which said frame and weight are relatively movable in a fixed plane, a rolling mandrel having its axis substantially at a right angle to said plane, means carried by the frame providing a bearing for the mandrel, a spring wire carried by the pendulum weight frictionally engaging the mandrel at a substantially right angle to its axis, means carried by the mandrel providing a mirror surface, light-emitting means arranged to project a beam of light upon the mirror surface, adjustable stop means for limiting the relative movement of the weight and frame, and an adjustable resilient supporting means for the pendulum weight resiliently connecting said weight with the frame.

13. In a vibration indicator, the combination with a pendulum weight, of a supporting frame therefor, means providing a pivot axis between the frame and the weight about which said weight and frame are relatively movable in a fixed plane, a rolling mandrel having its axis substantially at a right angle to said plane, means carried by the frame providing a bearing for the mandrel, a spring wire carried by the pendulum weight frictionally engaging the mandrel at substantially a right angle to its axis, means providing a light-reflecting mirror surface carried by the mandrel, adjustable stop means for limiting the relative movement of the weight and frame, and adjustable resilient supporting means for the pendulum weight resiliently connecting said weight with the frame, and light-emitting means arranged to project a beam of light upon the mirror surface.

14. In a vibration indicator, the combination with a pendulum weight, of a supporting frame therefor having walls providing an enclosure for the weight, a linear pivot means for the weight carried by the frame, a rolling mandrel, means carried by the weight frictionally engaging the mandrel, bearing means on which the mandrel rolls are carried by the frame, a plurality of supporting feet for the frame carried by at least one of said walls, and means connected with the weight and frame providing an adjustable resilient connection between them.

In witness whereof, we have hereunto set our hands this 14th day of January, 1926.

ARTHUR L. KIMBALL, Jr.
EDWIN H. HULL.